United States Patent [19]

Taylor

[11] 4,437,492

[45] Mar. 20, 1984

[54] POPPET CHECK VALVE

[76] Inventor: Julian S. Taylor, 8300 SW. 8, Oklahoma City, Okla. 73108

[21] Appl. No.: 352,287

[22] Filed: Feb. 25, 1982

[51] Int. Cl.³ ............................................. F16K 15/06
[52] U.S. Cl. ................................................ 137/543.13
[58] Field of Search .................... 137/543.13, 542, 543

[56] References Cited

U.S. PATENT DOCUMENTS

| 469,853 | 3/1982 | Gibson | 137/543.13 |
| 3,209,777 | 10/1965 | Salisbury | 137/543.13 |

Primary Examiner—Martin P. Schwadron
Assistant Examiner—John S. Starsiak, Jr.
Attorney, Agent, or Firm—Robert K. Rhea

[57] ABSTRACT

An inline check valve housing, having a valve seat adjacent its inlet end normal to the axis of its fluid passageway, is provided with a plurality of webs projecting inwardly of its inner wall surface defining a guide for axial movement of a poppet valve having a polygonal-shaped shank toward and away from the housing valve seat. The webs each have an inwardly projecting lug at its end portion opposite the valve seat for engaging recessed spaced opposing circumferential edge portions of a valve shank guide cooperatively surrounding the poppet valve shank for preventing angular rotation of the shank guide and poppet valve relative to the housing.

4 Claims, 12 Drawing Figures

POPPET CHECK VALVE

BACKGROUND OF THE INVENTION

1. Field of the Invention

The present invention relates to check valves and more particularly to a poppet check valve.

Check valves generally comprise a valve housing interposed in a fluid line in which a valve member, contained by the housing, is moved off its seat by fluid to permit fluid flow in one direction and moved to a closed position with its seat to interrupt fluid flow in the opposite direction. These check valves are usually provided with a lateral normally closed port for inserting the valve member during assembly or replacing the valve member during repair. In one type check valve the seat is parallel with the axis of fluid flow and the valve member is lifted off its seat by fluid flow in one direction and moved to sealing relation with its seat by fluid flow in the opposite direction. In another type check valve, sometimes called a "flapper check valve," the valve seat is normal to the direction of fluid flow and the valve member is hingedly moved toward and away from its seat by fluid flow through the housing.

Prior attempts to utilize the concept of an inline poppet check valve have generally been unsatisfactory by reason of fluid induced rotation and consequent wear and failure of the valve member.

This check valve is distinctive over check valves presently available on the open market by providing a valve housing having the valve seat normal to the direction of fluid flow and includes a non-rotating spring urged poppet valve and poppet valve guide inserted into the valve housing through one end thereof and supported by housing webs for movement toward and away from the valve seat.

SUMMARY OF THE INVENTION

A generally cylindrical valve housing, defining an axial fluid passageway having a diametrically enlarged central portion, is provided with a seat adjacent its inlet end normal to the axis of the fluid passageway. A plurality of opposing webs project inwardly from the inner wall surface of the enlarged central portion of the housing and are undercut on a diameter equal to the inside diameter of the inlet end of the housing to define an axial path for movement of a poppet valve and inwardly projecting lugs at the downstream end of the respective webs opposite the valve seat. A poppet valve, having a polygonal shank and having a seat mating with the housing valve seat, is dimensioned for manual insertion into the valve housing from its end opposite the seat. A disk-like valve guide, having a polygonal-shaped central bore slidable on the poppet valve shank and a periphery loosely received between the undercut portions of the webs, is axially and non-rotatably held in place with its peripheral edge portions underlying the web lugs by a helical spring interposed between the valve guide and poppet valve around the valve shank.

The principal objects of this invention are to provide a poppet check valve in which the poppet valve and its guide may be inserted into and removed from the valve housing through its outlet end and in which the valve guide prevents fluid induced angular rotation of the valve guide and poppet valve.

DESCRIPTION OF THE PREFERRED EMBODIMENT

Figure 2:
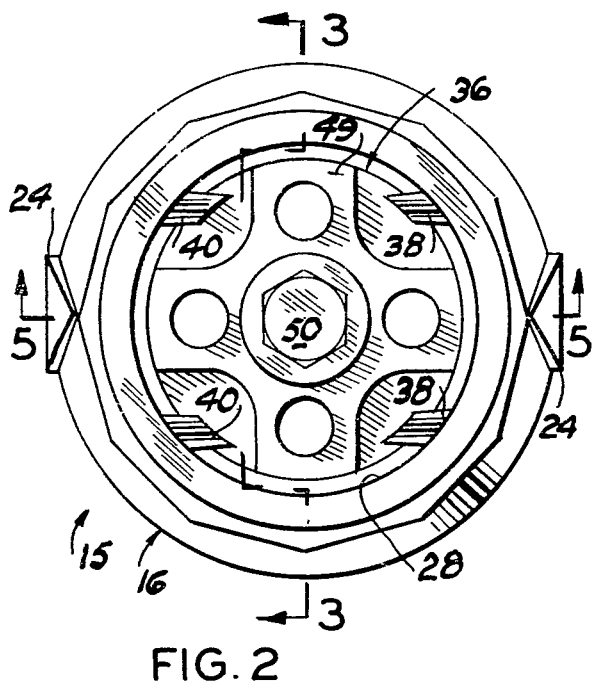
FIG. 2 is a left end elevational view of FIG. 1.
Figure 1:
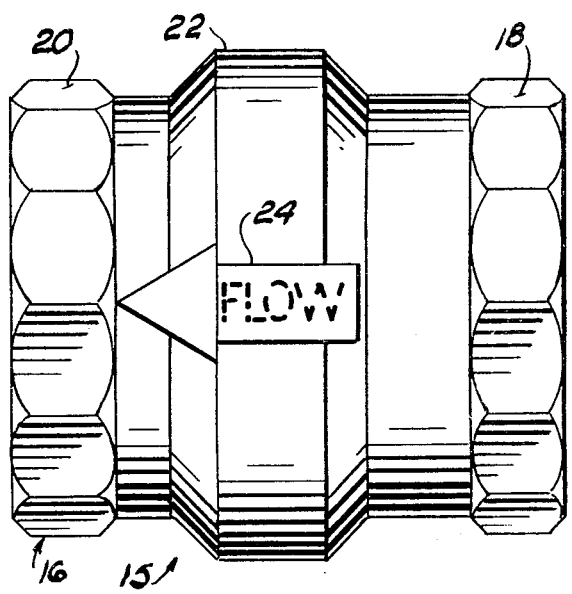
FIG. 1 is a side elevational view of the check valve.
Figure 4:
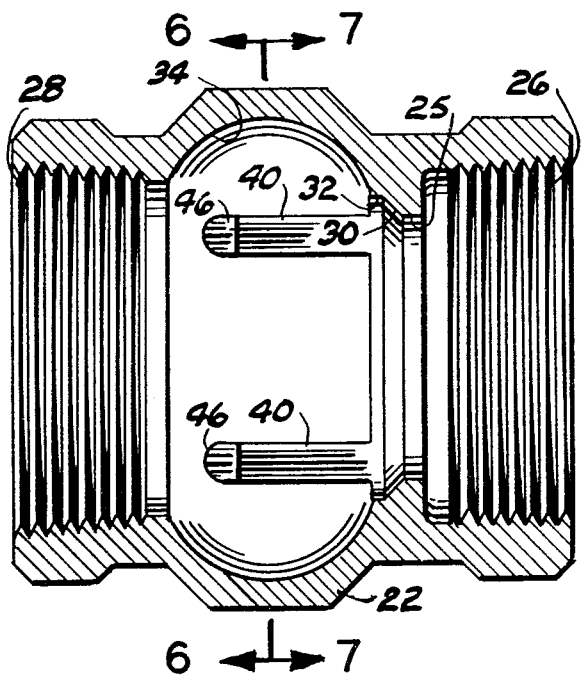
FIG. 4 is a longitudinal sectional view similar to FIG. 3 with the valve means removed.
Figure 3:
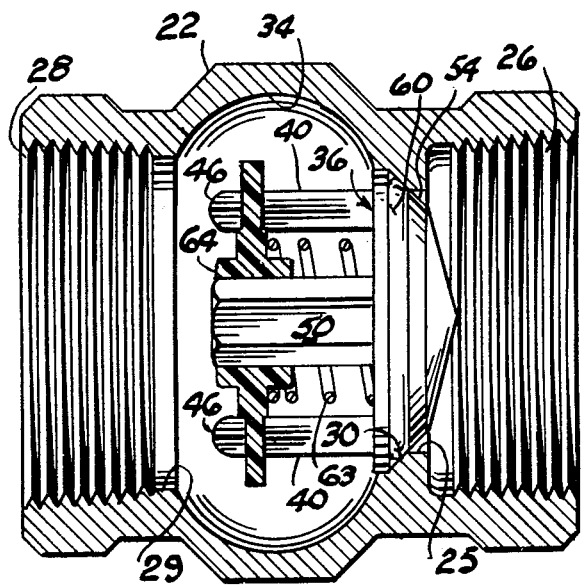
FIG. 3 is a longitudinal sectional view taken substantially along the line 3—3 of FIG. 2.

Like characters of reference designate like parts in those figures of the drawings in which they occur.

In the drawings:

The reference numeral 15 indicates the check valve comprising a generally cylindrical housing 16, which may be a casting, having wrench flats 18 and 20 at its respective end portions and a diametrically enlarged portion 22 medially its ends. The housing is preferably provided with at least one arrow 24 on its exterior for indicating the direction of fluid flow. The housing 16 is centrally bored, as at 25, to define a fluid passageway and is counterbored and internally threaded at its respective inlet and outlet ends 26 and 28 for connection with a pipe line, or the like, not shown. The counterbore 29, adjacent its inlet end, is diametrically greater than its bore 25 for the reasons presently apparent. Adjacent its bore 25 the inner wall surface of the housing is provided with a valve seat 30 facing its outlet end 28 which terminates in an annular bore or shoulder 32 diametrically greater than the bore 25. The inside diameter of the counterbore 29 is at least equal to the diameter of the annular shoulder 32 for the reasons presently explained.

Between the annular shoulder 32 and counterbore 29 the inner wall surface of the housing enlarged portion 22 defines an arcuate concave surface 34 effectively enlarging the fluid passageway for free flow of fluid around a valve means 36 when unseated, as hereinafter explained.

Figure 5:
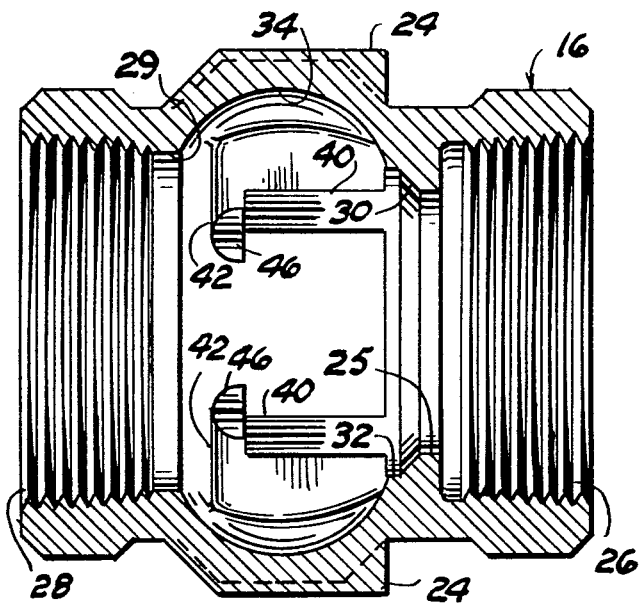
FIG. 5 is a longitudinal sectional view similar to FIG. 4 taken substantially along the line 5—5 of FIG. 2.

The housing further includes two pairs of spaced-apart generally parallel webs 38 and 40 integral with and projecting inward in confronting relation from the housing arcuate inner wall surface 34 a distance substantially equal to the spacing between the inner wall surface 34 and a cylindrical plane generated by the housing bore 25. The webs 38 and 40 extend longitudinally of the housing from the annular shoulder 32 and terminate downstream in a free end surface 42 (FIG. 5) in spaced relation with respect to the plane of the counterbore 29. The spacing between the webs of the respective pair of webs is greater than the radius but less than the diameter of the inlet end bore 25.

Figure 6:
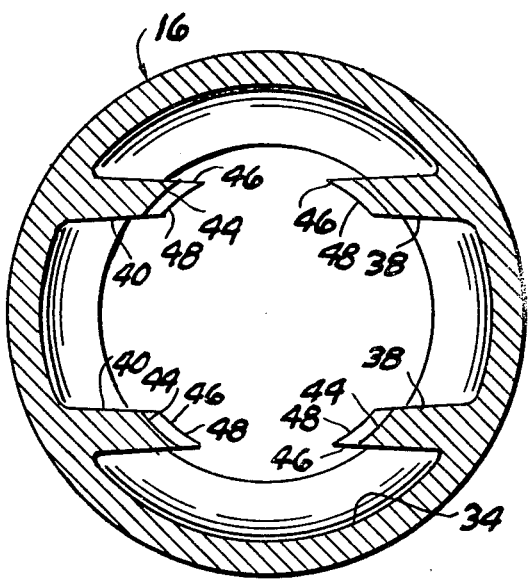
FIGS. 6 and 7 are diametric sectional views taken substantially along the lines 6—6 and 7—7, respectively, of FIG. 4.
Figure 8:
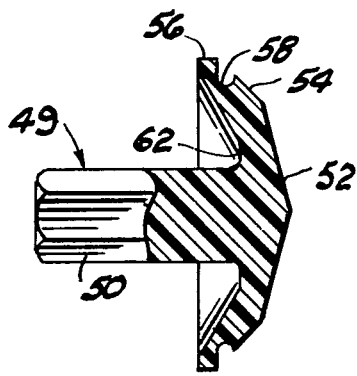
FIG. 8 is a longitudinal cross sectional view, partially in elevation, of the poppet valve with its sealing ring removed.
Figure 7:
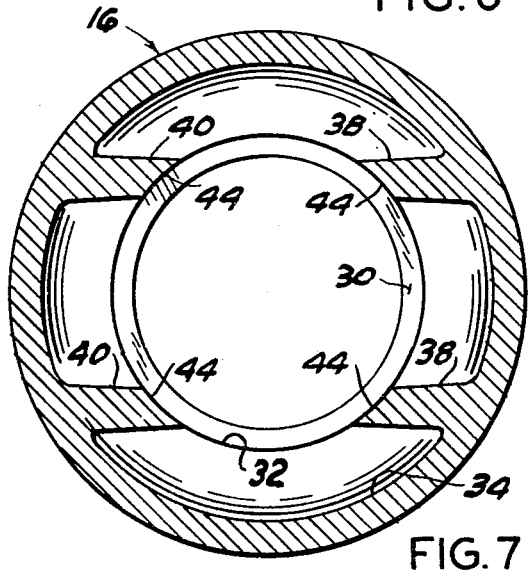
Figures 9, 10, 11, 12:
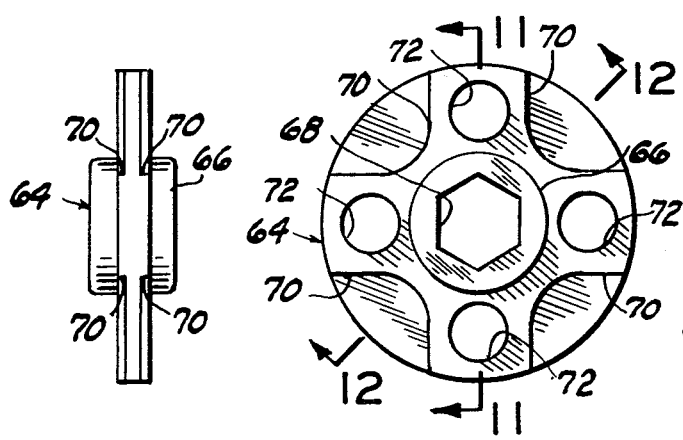
FIG. 9 is an end elevational view of the poppet valve shank guide, per se.
FIG. 10 is a side elevational view of FIG. 9.
FIGS. 11 and 12 are cross sectional views taken substantially along the lines 11—11 and 12—12 of FIG. 9, respectively.

As best shown by FIG. 7, the inwardly directed surfaces of the webs 38 and 40 are bored or faced on a diameter equal to the diameter of the annular shoulder 32 with the facing or bore 44 terminating in spaced relation with respect to the free end surface 42 of the webs to define overhanging inwardly projecting lugs 46. The inward ends of the respective lugs 46 are similarly bored or faced, as at 48 (FIG. 6), on a selected smaller diameter not less than the diameter of the bore 25 for the purposes believed presently apparent.

The poppet valve means 36 includes a poppet valve 49 having a polygonal-shaped stem or shank 50, preferably hexagonal, coaxially connected with a head portion having a general conical-shaped end surface 52 opposite the shank defining an annular seat 54 for mating with the valve seat 30. The seat 54 terminates in an annular peripheral surface 56 parallel with the longitudinal axis of the shank 50 and freely received by the annular shoulder 32. The valve seat 54 is provided with a circumferential groove 58 for nesting a sealing ring, such as an O-ring 60, to insure a fluid tight seal with the valve seat 30. The head end portion of the poppet valve 49 is undercut or recessed, as at 62, around its shank 50 for nesting a spring 63, as presently explained. The overall length of the poppet valve shank 50 from the plane defined by the downstream limit of the valve head is at least less than the radius of the housing counterbore 29 for the purposes presently apparent.

A substantially disk-like poppet valve shank guide 64, having a diameter freely slidable longitudinally of the housing within the web bore or facings 44, is provided with a thickened hub portion 66 which is centrally provided with a complemental hexagon bore 68 for slidably receiving the poppet valve shank 50. Circumferentially equally spaced peripheral edge portions, four in the example shown, one for each of the web lugs 46, of the respective end surfaces of the shank guide, are recessed or cut away outwardly of the hub 66 and defined by shoulders 70 to prevent angular rotation of the shank guide about the axis of the poppet valve 49. Outwardly of the hub 66 and between the recesses, the shank guide 64 is further provided with a plurality, four in the example shown, of circumferentially equally spaced apertures 72 for fluid flow therethrough.

The helical spring 63 is interposed between the poppet valve head and valve shank guide 64 around the shank 50.

Operation

The poppet valve 49, spring 63 and shank guide 64 are inserted as a unit into the valve housing through its outlet end 28. This is accomplished by placing the valve guide 64 on the shank 50 with the spring 63 interposed between the valve head and the guide. The valve guide 64 is moved toward the valve head until it flatly contacts the adjacent end surface of the head and is held in this position for manual insertion through the counterbore 29 by disposing the valve shank normal to the axis of the fluid passageway. The juxtaposed valve head and valve guide, when disposed within the bore defined by the web facings 44, are then manually rotated to dispose the valve head toward the valve seat 30 and released so that the valve guide abuts the upstream surfaces of the web lugs 46 and the spring 63 urges the valve head against its seat 30. The valve guide 64 being angularly adjusted so that the respective web lug 46 is disposed within one of the valve guide recesses between the shoulders 70 (FIG. 2).

When it is necessary to replace the poppet valve O-ring 60, the poppet valve, its guide and spring are removed as a unit from the valve housing by manually forcing the valve guide into a juxtaposed position with the valve head. The valve and its guide are then rotated within the confines of the webs so that the valve shank is normal to the axis of the flow passage and can be removed through the housing counterbore 29.

In use, the valve housing, with the valve means installed, is connected with a pipe line in a conventional manner with the valve head facing upstream.

Obviously the invention is susceptible to changes or alterations without defeating its practicability. Therefore, I do not wish to be confined to the preferred embodiment shown in the drawings and described herein.

I claim:

1. A check valve, comprising:
  a housing having a fluid passageway therethrough and having a valve seat normal to the axis of the passageway;
  poppet valve means for closing the passageway in response to fluid flow in one direction,
    said poppet valve means including a poppet valve having a head provided with a seat for sealing with the housing valve seat,
    said poppet valve having a coaxial polygonal-shaped shank projecting downstream from its head;
  poppet valve guide means for maintaining said poppet valve in axial alignment with the passageway and preventing angular rotation of the poppet valve relative to the housing,
    said poppet valve guide means including a plurality of webs projecting into the fluid passageway from the inner wall surface of said housing for maintaining said poppet valve head coaxial with the housing valve seat,
    said webs each having an inwardly projecting lug at its end portion opposite the housing valve seat;
  a shank guide supported by said webs coaxial with the fluid passageway on the upstream side of said web lugs,
    said shank guide having a bore complemental with the periphery of said shank permitting longitudinal sliding movement of said shank relative to said shank guide;
  resilient means interposed between said shank guide and said poppet valve head for biasing said poppet valve toward said housing valve seat; and,
  means preventing angular rotation of said shank guide relative to said housing.

2. The check valve according to claim 1 in which said shank guide is disk-like and is provided with a like plurality of circumferentially spaced recesses in at least one of its end surfaces for nesting the respective said web lug.

3. The check valve according to claim 2 in which said valve housing is characterized by a fluid outlet end having an inside diameter at least equal with the diameter of said poppet valve head and the overall length of said poppet valve is substantially equal to the radius of the housing outlet inside diameter,
  whereby said poppet valve and said shank guide may be inserted as a unit into and removed from said housing through its outlet end.

4. The check valve according to claim 2 or 3 in which said plurality of webs comprise:
  two pairs of spaced-apart webs extending downstream from the housing valve seat with the innermost edge of each web of one said pair of webs disposed in confronting relation with respect to the innermost edge of the respective web of the other said pair of webs.

* * * * *